Oct. 20, 1959     L. R. HULLS ET AL     2,909,717
ANALOGUE TO DIGITAL CONVERTER APPARATUS
Filed July 19, 1957     3 Sheets-Sheet 1

WITNESSES:
Bernard R. Gieguay
Leon J. Laza

INVENTORS
Leonard R. Hulls and
Robert L. Duke.
BY R.H.Brodahl
ATTORNEY

Oct. 20, 1959  L. R. HULLS ET AL  2,909,717
ANALOGUE TO DIGITAL CONVERTER APPARATUS
Filed July 19, 1957  3 Sheets-Sheet 2

United States Patent Office 2,909,717
Patented Oct. 20, 1959

2,909,717

ANALOGUE TO DIGITAL CONVERTER APPARATUS

Leonard R. Hulls and Robert L. Duke, Dundas, Ontario, Canada, assignors to Canadian Westinghouse Company, Limited, Hamilton, Ontario, Canada Application July 19, 1957, Serial No. 672,917

7 Claims. (Cl. 318—28)

The present invention relates, in general, to control apparatus for a motor or like device, and more particularly to control apparatus for a motor or like device and operative to convert or change a first analogue type of control signal that varies as a function of the movement of said motor or like device, into a second and digital type of control signal that may be combined with other digital type of control signals as may be desired, or may be utilized in digital form for controlling said motor or other device.

The screw-down setting required for a given pass in a steel strip rolling mill is normally known in advance and a control system which will automatically position the screw-down to a predetermined program will improve the efficiency of the rolling mill by both reducing rolling time and improving the uniformity or gauge of the rolled product. Positioning of the screw-downs may be achieved using a purely analogue type of control signal, but this type of analogue system is not nearly so easily programmed as is its digital counterpart.

Analogue to digital devices working with brushes and segmented commutator plates are available in the prior art, but these devices suffer from the disadvantage that their maximum operative speed is limited and the type of construction used is not appropriate for heavy industrial control, such as encountered with a steel strip rolling mill in particular.

It is an object of the present invention to provide an improved control apparatus operative with an analogue type of input control signal that may, for example, correspond to the actual position of some member, for providing a digital type of control signal available for more accurately controlling the position of said member as may be desired.

It is another object of the present invention to provide an improved control apparatus operative with digital type of control systems for providing in a more simple and more reliable manner a suitable control signal in digital form corresponding to some desired information to be supplied to said control apparatus.

It is a further object of the present invention to provide an improved control apparatus suitable for digital type of control systems that is more rugged and suitable for heavy industrial usage and at practical operative speeds.

It is a different object of the present invention to provide an improved digital control apparatus operative with a strip rolling mill or like device, and including an automatic reset for the zero position of the roller members of the rolling mill to compensate for changing the size of the roller members and like operations.

It is an additional object of the present invention to provide an improved analogue to digital signal converting or changing apparatus operative to fail-safe in the event of a power supply failure, and which is of particular importance for rolling mill or like control applications wherein very expensive equipment is being controlled.

These and other objects and advantages of the present invention will become apparent in view of the following description taken in conjunction with the accompanying drawings, wherein.

Figure 1:
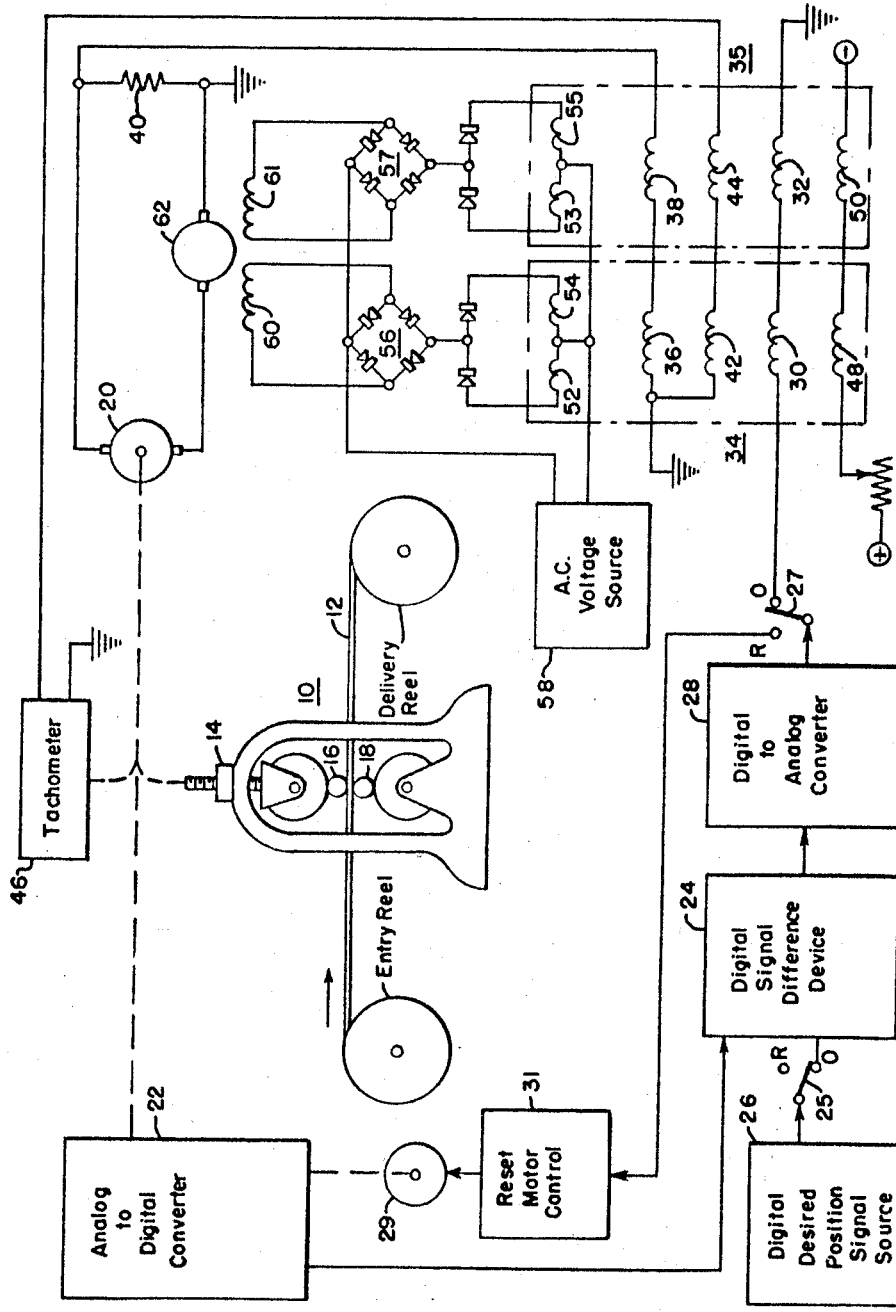
Figure 1 is a schematic showing of one form of the control apparatus in accordance with the present invention.

In Fig. 1 there is shown one stand 10 of a rolling mill operative with a strip of material 12 for determining the thickness or gauge of the strip of material 12. A screw-down control device 14 is operative to determine the spacing between the upper roller member 16 and the lower roller member 18 of the rolling mill stand 10. A screw-down control motor 20 is operatively connected to the screw-down control device 14 for controlling the screw-down operation. An analogue to digital converter device 22 is operatively connected to the screw-down motor 20 such that it follows the rotary position of the shaft of the screw-down motor 20 as a predetermined analogue function. The output of the analogue to digital converter apparatus 22 is provided in digital form to one input of a digital signal difference device 24. A second input of the digital signal difference device 24 receives a second reference control signal in digital form from a digital desired position signal source device 26, as well known to persons skilled in this particular art.

The output of the digital signal difference device 24 is representative of the error between the actual position of the screw-down motor 20 or the actual position or spacing of the upper roller member 16 relative to the lower roller member 18 as compared to the predetermined and desired position of the screw-down motor 20 or as compared to the desired position or spacing of the upper roller member 16 relative to the lower roller member 18. This error correction signal or difference signal is applied to the input of a digital to analogue converter device 28 which, in turn, provides in analogue form, a control signal to the control windings 30 and 32 of the push-pull connected magnetic amplifier devices 34 and 35 operative to control the operation of the screw-down motor 20. A second pair of control windings 36 and 38 may be energized by a compensating feedback signal as determined by the armature current of the screw-down motor 20 and as sensed by an impedance member 40 connected in the armature circuit of the screw-down motor 20 as well known in this art. A third pair of control windings 42 and 44 may be energized by a stabilizing signal received from a tachometer device 46 operatively connected to the screw-down motor 20 for providing a signal which varies as a function of the operative speed of the screw-down motor 20. A pair of bias windings 48 and 50 may be provided as well known to persons skilled in this art, and energized from a suitable source of direct current energy as indicated on the drawings. The output load windings 52 and 54 of amplifier device 34 are connected through self-saturating rectifier devices across a bridge rectifier device 56 and operative with a suitable alternating current energy supply 58. The output load windings 53 and 55 of amplifier device 35 are similarly operative with the bridge rectifier device 57 and the alternating current voltage source 58. The rectifier bridge 56 is operative to energize the control field 60 of a supply generator 62 and rectifier bridge 57 is operative to energize control field 61 for controlling, as well known to persons skilled in this art, the energization of the screw-down motor 20 as may be desired to provide the desired positioning of the screw-down device 14 and thereby the desired spacing between the upper roller member 16 and the lower roller member 18.

When a first pair of roller members 16 and 18 are replaced by a second pair of a different size, the control apparatus shown in Figure 1 should be reset to be operative with the second pair of roller members. A first switch member 25 is moved from its illustrated normally operative position O to its reset position R, to remove the desired position or reference signal from the difference device 24. A second switch member 27 is moved to its reset position R, to connect the output of the digital to analogue converter 28 to control the reset motor 29 through the reset motor control 31. A closed loop reset circuit is thereby provided including the analogue to digital converter 22 and the reset motor 29. This closed loop reset circuit is now operative to reset the analogue to digital converter 22 until it provides a zero output signal. This now corresponds to the position of the screw-down motor 20 and the screw-down control 14 at which the second pair of roller members are just touching. The switch members 25 and 27 may now be moved into their normally operative positions O, as shown in Fig. 1.

Figure 2:
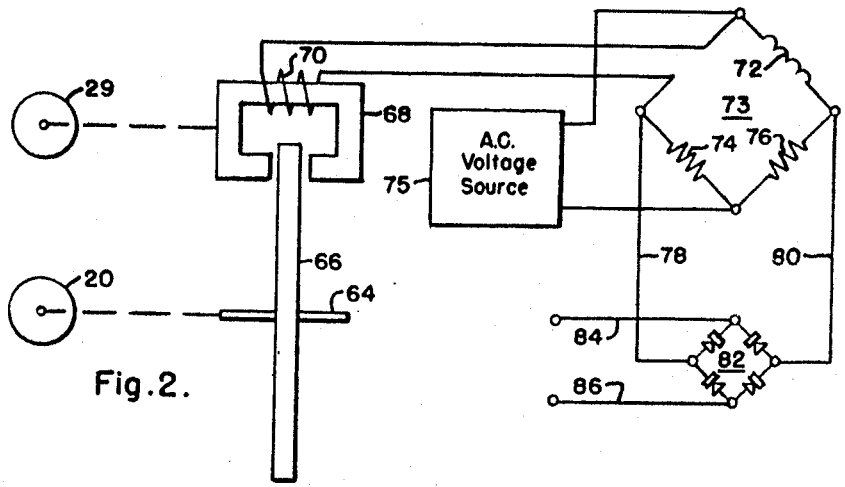
Fig. 2 is a schematic showing of the analogue to digital converter apparatus shown in Fig. 1.

In Fig. 2, there is shown one suitable form of the analogue to digital converter apparatus, as shown in Fig. 1. A shaft member 64 carries a rotatable disc member 66 having a plurality of teeth at its periphery and which is positioned between the pole faces of an armature or core member 68 energized by a coil 70 to thereby determine the effective impedance or inductance of the coil 70. The latter coil 70 is positioned in one arm of a balanced bridge circuit including a dummy or reference coil 72 and a pair of similar impedance devices 74 and 76, such that the variations in the inductance or the impedance of the coil 70, as determined by the position of the disc member 66, are supplied as a control signal through the conductors 78 and 80 to the alternating current terminals of a rectifier bridge 82. The direct current terminals of the rectifier bridge 82 are connected through conductors 84 and 86 to provide an output control signal which varies as a function of the rotary position of the disc member 66.

Figure 3:
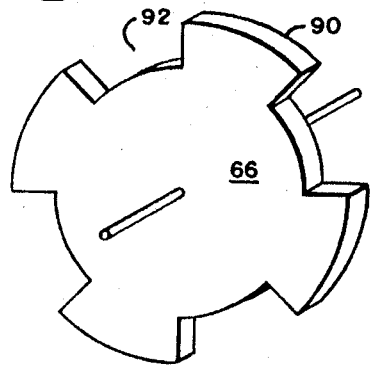
Fig. 3 is a side view of the control member or rotating disc member of the analogue to digital converter apparatus.

In Fig. 3 there is shown a side view of the disc member 66 which may be made of magnetic material and include alternate solid control portions 90 and alternate cut-out control portions 92 such that when a solid or tooth portion 90 is positioned between the pole faces of the armature member 68, shown in Fig. 2, the coil member 70 has a first inductance value, and when a cut-out or non-tooth portion of the disc member 66 is positioned between the pole faces of the armature 68, shown in Fig. 2, the coil member 70 has a second and lower inductance value. Thusly, the apparatus shown in Fig. 2 may be operative to provide an output signal having either a unit value or a zero value depending upon the rotary position of the disc member 66, and may be operative to supply one digit of a binary control signal in digital form. The shaft member 64, shown in Fig. 2, may be connected to the screw-down motor 20, shown in Fig. 1, and a plurality of the control devices as shown in Fig. 2 may be provided, with one of such control devices being provided for each digit of the desired binary control signal. Further, such control devices may be arranged such that the first digit device has, for example, one tooth, the second digit device has two teeth, the third digit disc member has four teeth, the fourth digit disc member has eight teeth, and the fifth digit disc member has sixteen teeth, and so forth in binary fashion. The resulting analogue to digital converter apparatus thereby can provide for a single full rotation of the shaft member 64 an output binary control signal in digital form coresponding to the rotary position of the shaft member 64, which thereby may be made, through suitable gearing or like coupling devices, to correspond to the actual position of the shaft of the screw-down motor 20 or the actual position of the screw-down device 14.

Figure 4:
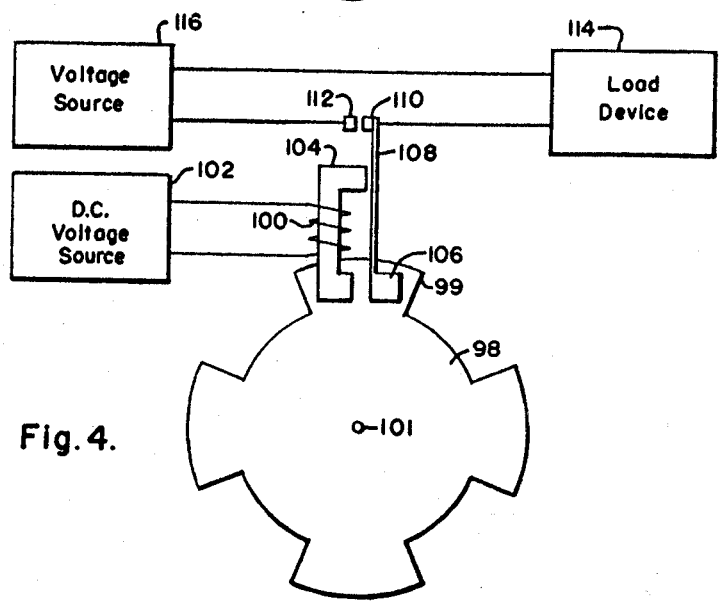
Fig. 4 shows a modification of the analogue to digital converter apparatus.

In Fig. 4, there is shown a further modification of the control apparatus of the present invention, wherein a disc member 98, provided with four teeth and four cutout portions, is operative with the magnetic field provided by a coil member 100 energized by a direct current voltage source 102 and operative with a core member 104 in cooperation with a second core segment 106 that is provided with a strip of spring steel or like material 108. The latter spring strip 108 carries a first contact 110 that is cooperative with a second contact 112. A load device 114 may be energized by a direct current voltage source 116 by, for example, a unit value of voltage when the contact member 110 is touching the contact member 112 as a result of a tooth or solid portion 99 of the control disc 98 being in the position as shown in Fig. 4. When a cutout or non-tooth portion of the control disc 98 is in the position shown by the tooth member 98, then the spring strip member 108 has an adequate resilience to separate the contact member 110 from the contact member 112 to thereby provide a zero or no-voltage control signal to the load device 114. Thusly, it can be seen that one of the control devices, as shown in Fig. 4, may be provided for each digit of a binary control apparatus. The control member 98 for the first digit may have one tooth, whereas the control member 98 for the second digit may have two teeth, and so on in binary fashion. A resulting analogue to digital converter apparatus may thusly be provided having a control device of the type shown in Fig. 4, for each digit of the desired output control signal, such that when the supporting shaft 101 is rotated as a predetermined function of the rotation or position of a movable member an output control signal in digital form and comprising binary unit or zero value digits may be thereby provided.

Figure 5:
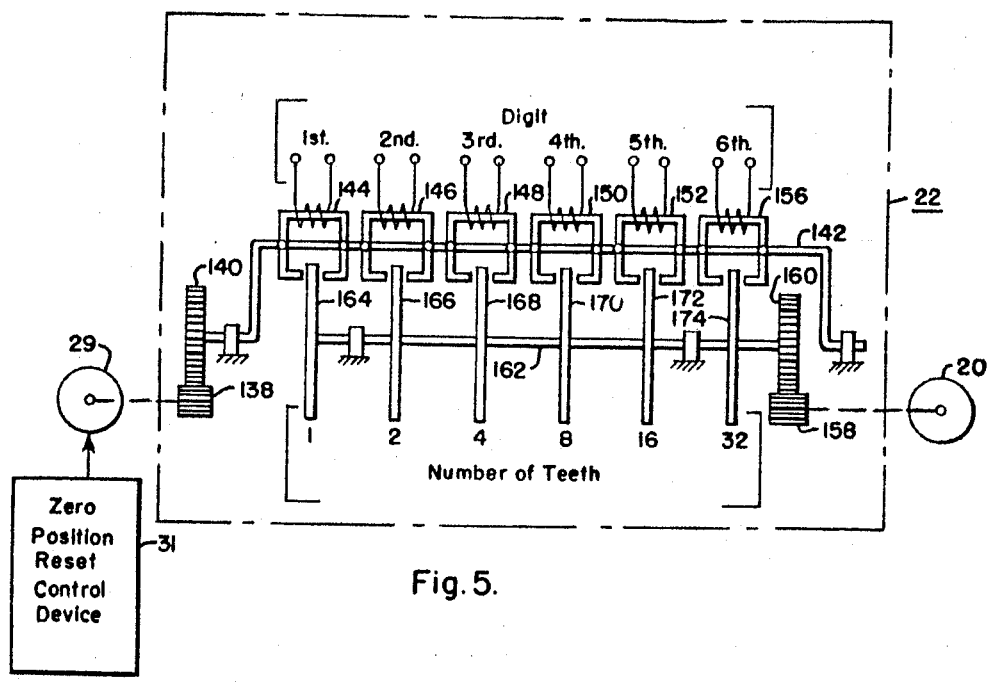
Fig. 5 is a schematic view showing a modification of the control apparatus in accordance with the present invention.

In Fig. 5, there is shown one modification of the analogue to digital converter device 22, operative with the reset control device shown in Fig. 1, wherein the reset motor control device 31 is operative with the reset motor 29 to vary the position of a pinion gear 138 operative with a spur gear 140 to vary the angular position of a support arm 142 on which is mounted the respective armature members 144, 146, 148, 150, 152 and 156 for the respective six digits of a binary control signal to be supplied as a predetermined function of the actual position of the screw-down motor 20. For example, the screw-down motor actual position is supplied through a pinion gear 158 operative with a spur gear 160 for rotating a support shaft 162 carrying a plurality of disc members 164, 166, 167, 170, 172 and 174 cooperative with the respective armature members 144, 146, 148, 150, 152 and 156. In this regard, the disc member 164 corresponding to the first digit of the desired control binary signal may have one tooth and one cutout portion. The disc member 166 for providing the second digit may be provided with two teeth and two cutout portions, the disc member 168 for providing the third digit may be provided with four teeth and four cutout portions, the disc member 170 for providing the fourth digit may be provided with eight teeth and eight cutout portions, the disc member 172 for providing the fifth digit may be provided with sixteen teeth and sixteen cutout portions, and the disc member 174 for providing the sixth digit may be provided with thirty-two teeth and thirty-two cutout portions.

Thusly, it is seen that control apparatus has been provided to convert a shaft position into a digital output control signal for the purposes of accurately positioning said shaft. The particular application under consideration may concern the positioning of the screw-down control for a steel strip rolling mill.

In a typical rolling mill application, it is necessary that the analogue to digital converter apparatus should read zero and thereby provide a binary control signal corresponding to a zero position of the screw-down device or screw-down motor when the roller members of the mill stand are just touching. This zero position setting may be achieved by interposing a clutch device between the converter apparatus and the actual screw-down drive, however, such a system is inherently not so reliable as is a device which is capable of being solidly connected to the screw-down drive device or drive motor. Further, the possibility of damage to the rolling mill due to the failure of the positioning equipment is considerable and due to the extreme expense of rolling mill apparatus. The reliability of the control converter apparatus is of prime importance.

A practical application for the subject control apparatus would be required to position a shaft member to within one-tenth of a turn in a total travel of five turns. An analogue to digital converter apparatus for this application to provide the desired binary control signal will be required to produce a binary control signal varying anywhere from zero to fifty. The binary control signal will require six digits with the zero position binary control signal corresponding to six zero digits 000000 and the fifty position binary control signal corresponding to 110010. The least significant digit will require to change every one-tenth of a turn of the shaft. In practice, it is necessary to make the number of teeth available per turn in the least significant digit position equal to $2^{n-1}$, with $n$ being an integer dependent upon the desired accuracy of the converter apparatus. A further matter for consideration is the method of representing the binary number. There will be a circuit or a relay contact corresponding to each digital position with a unit value signal or a zero value signal being provided to represent each digit corresponding to that particular shaft position.

In the event of a power failure, the output binary control signal may read all unit value signals or all zero value signals. Thusly, one modification of the present apparatus would provide a double circuit for each digit position, such that the output binary signal would read neither a unit value nor a zero value for each digit in the event of a failure. The apparatus shown in Fig. 6 will accomplish this result.

Each of the control members or discs may be made of either aluminum or a suitable ferromagnetic material. For the aluminum disc, the pick-off device may consist of a small iron circuit including an armature 68, as shown in Fig. 2, with the periphery of the control disc 66 passing through a gap in the iron circuit of the armature device 68. The iron circuit is operable with the control winding 70 whose inductance will depend upon whether the gap consists of air or aluminum. When the control member 66 is so positioned to provide an aluminum tooth in the air gap of the armature member 68, the magnetic circuit arrangement will be equivalent to a short-circuited turn, and the inductance of the coil member 70 will be thereby reduced. The coil member 70 is connected in the bridge circuit 73 and energized by the A.C. voltage source 75 with a similar pick-off or reference unit, if desired, 72 mounted away from the disc 66. If, for example, the frequency of the alternating current voltage source 75 is in the order of 400 cycles per second, the output signal thereby received or provided may be rectified in the bridge circuit 82 to give one digit of an output binary signal of either unit value or a zero value, for a predetermined one of the digits of the overall binary control signal. In this regard, it should be noted that the control member 66 may be made of steel or like material and would similarly provide a variation in the iron circuit permeance as determined by the presence of a tooth in the air gap of the core member 68 or the absence of a tooth in the air gap to provide the desired balance or unbalance of the bridge circuit 73.

Referring to the modification of the control apparatus as shown in Fig. 4, if the control member 98 is made of steel, the tooth 99 may be used to close the iron circuit including the core member and the core segment 106 to thereby provide a relay device having a coil 100 continuously energized by the direct current voltage source 102.

In general, if it is desired to provide six digits for the output binary control signal, this will require using six control member discs 66 as shown in Fig. 2, or if it is desired that protection against power failure be included, twelve such control member discs 66 would be required. It is preferable that the input shaft 64 receiving the analogue input signal should not make more than one complete revolution and therefore appropriate gearing may be desired between the shaft whose position is to be digitized and the analogue converter apparatus. If the system is to produce an $n$ digit output binary control signal, the least signficant digit disc member, such as the control member 66, should have around its periphery $2^{n-1}$ teeth or 32 teeth for the six digit binary control signal example under consideration. Hence, a rotation of the shaft member 64 of $\frac{1}{64}$ of a turn of the least significant disc, will produce a change of unit value in the least significant digit. If the design requires that this latter change of unit value represents one-tenth of a turn of the shaft to be measured and that the measuring device never makes more than one complete revolution, then the gear ratio between the analogue input shaft 64 and the screw-down motor 20 in the example shown in Fig. 1 should be $$\frac{64}{10}:1 = 6.4:1$$

Regarding the selection of the appropriate gear ratio, the desired accuracy should be considered and avoiding ambiguity should be considered. If the shaft carrying the disc members makes more than one revolution, ambiguity will occur. If there are $n$ teeth on the disc for the least significant digit, the apparatus is capable of positioning some load member to within $1/2n$ of a full turn of said disc. If the apparatus is required to position the load member to within $\frac{1}{10}$ of a full turn, then the required gear ratio will be $2n/10$ to one.

In the control apparatus as shown in Fig. 5, it may be desirable to provide a reset of the analogue to digital converter apparatus for resetting the zero position of the converter apparatus to compensate for changes in the input analogue signal. For example, in determining the spacing between the roller members of a mill stand such as shown in Fig. 1, the important dimension is the spacing between the roller members, and the screw-down position, therefore, depends upon the size of the individual roller members. Should it become desirable to change the roller members and substitute a different size of roller members, it is necessary to reset the zero position of the converter apparatus, such that the binary control signal corresponding to the zero position as initially scheduled to the converter apparatus now corresponds to the positions of the different size roller members when the roller members are just touching or in their zero position. In this regard, the pick-off armature members 144, 146, 148, 150, 152 and 156 may be supported on a support arm 142 having an angular position controlled by the spur gear 140 such that the support arm 142 may be rotated concentrically about the center line of the disc members 164 through 174. The arrangement shown in Fig. 5 eliminates the need for a clutch between the screw-down motor or screw-down device and the converter apparatus and thus permits resetting of the converter apparatus while still retaining the desirable feature of a solid drive between the screw-down mechanism and the converter apparatus.

The ultimate accuracy of the converter apparatus that may be obtained is limited only by the practical size of the teeth on the least significant control member disc corresponding to the control member disc 174 as shown in Fig. 5. However, any further required positioning accuracy may be obtained by gearing two or more of the units together.

Figure 6:
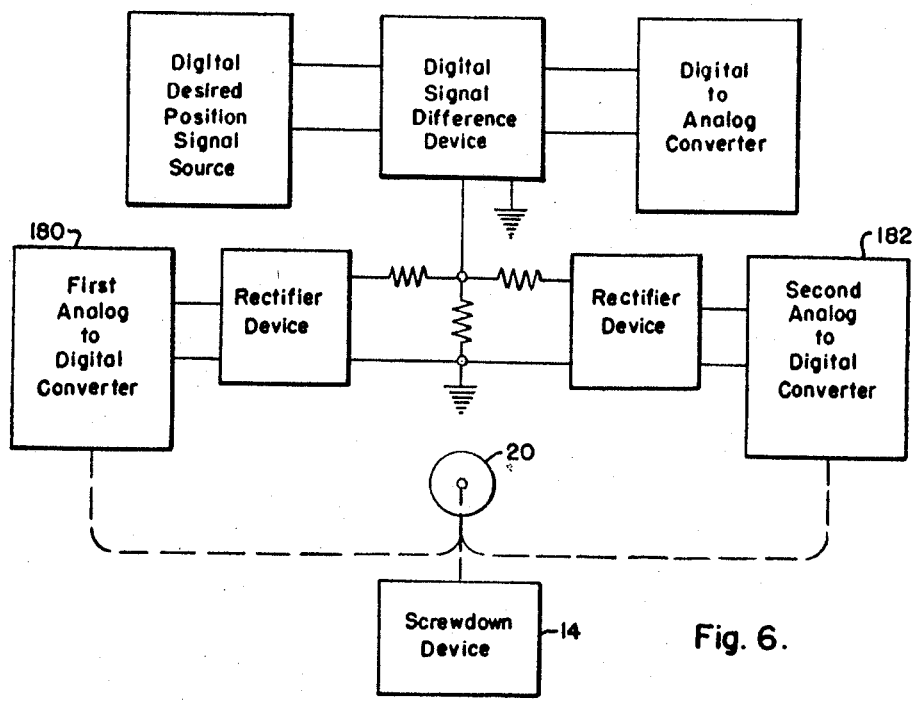
Fig. 6 shows a further modification of the apparatus.

With the control apparatus as shown in Fig. 6, two of the above discs are provided for each digit and each of these discs have the same number of teeth. One of these discs is located in each of the respective first converter 180 and second converter 182, and the respective discs are angularly displaced one tooth such that when a disc tooth is operative in the first converter 180 a cutout portion is operative in the second converter 182. The output of the first converter 180 is made to be either a positive signal or a zero signal. The output of the second converter 182 is made to be either a negative signal or a zero signal. Thusly, a positive signal from the first converter 180 may represent a binary "1" or unit valve signal, and a negative signal from the second converter 182 may represent a binary "0" or zero valve signal. If a power failure occurs, both the first converter device 180 and the second converter device 182 has a zero valve output.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. In digital control apparatus operative with a movable load member for controlling the position of said load member, said apparatus being operative with a source of voltage, the combination of a first control device having a variable inductance and being operative with said voltage source for providing a magnetic field, a second control device including a first control portion and a second control portion, with said second control device being operative with said magnetic field and connected to said movable load member such that a predetermined one of said first portion and said second portion is positioned within said magnetic field as determined by the movement of said movable load member to thereby determine the inductance of said first control device, and a position reset control device operatively connected to one of said first and second control devices and responsive to the inductance of said first control device for varying the position of said one control device relative to the position of the other of said first and second control devices.

2. In digital control apparatus operative with a movable load member for providing a digital control signal for controlling the position of said load member, said apparatus being operative with a source of voltage, the combination of a first control device having a variable inductance and being operative with said voltage source for providing a magnetic field, a second control device made of magnetic material and including a first control portion and a second control portion, with said first control portion containing a different amount of said magnetic material than said second control portion, and with said second control device being operative with said magnetic field and connected to said movable load member such that a predetermined one of said first control portion and said second control portion is positioned within said magnetic field as determined by the movement of said movable load member to thereby determine the inductance of said first control device, and a position reset control device operatively connected to one of said first and second control devices and responsive to the inductance of said first control device for varying the position of said one control device relative to the position of the other of said first and second control devices.

3. In digital apparatus operative to provide a binary control signal having a plurality of digits for controlling the position of a load member, said apparatus being operative with a source of voltage, the combination of a first control member including a plurality of first control devices, with one of said first control devices being provided for each digit of said binary control signal, and with each of said first control devices having a variable impedance value and being operative with said source of voltage to provide a magnetic field, a second control member including a plurality of second control devices, with one of said second control devices being provided for each digit of said binary control signal, and with each of said second control devices being operative with the respective magnetic field of one of said first control devices and including at least a first magnetic control portion and a second magnetic control portion, and a position adjustment device operatively connected to at least one of said second control devices and responsive to at least the impedance value of the first control device operative with said one second control device, with said second control member being operatively connected to said load member such that when the position of said load member is changed the impedance of each of said first control devices is correspondingly changed to thereby vary the respective digits of said binary control signal for controlling the position of said load member.

4. In digital apparatus for providing a digital control signal for controlling the position of a load member, said apparatus being operative with a source of voltage, the combination of a first control device including a plurality of variable impedance members, with one of said variable impedance members being provided for each digit of said binary control signal, a second control device movable relative to said first control device and including a like plurality of impedance control members, with each of said impedance control members being provided to vary the impedance of respectively one of said impedance members, and with said second control device being operatively connected to said load member to be movable as a predetermined function of the movement of said load member such that the impedance of each of said variable impedance members is varied as a predetermined function of the movement of said load member to thereby vary each digit of said binary control signal as a function of the movement of said load member, and a position adjustment device connected to one of said first and second control devices and responsive to the impedance of at least one of said impedance members for varying the position of said one control device as a predetermined function of the latter said impedance.

5. In digital apparatus operative to provide a digital control signal for controlling the position of a load member, the combination of a plurality of first control devices, with each of said first control devices being provided for one digit of said binary control signal and including a variable impedance relay device having a magnetic circuit, a like plurality of second control devices, with each of said second control devices being operative with respectively one of said first control devices and connected to said load member to be positioned as a predetermined function of the position of said load member to thereby vary the impedance of each of said variable impedance relay devices as a predetermined function of the position of said load member, and a position reset device operative with said first control device for positioning said first control device in accordance with the impedance of at least one of said relay devices and relative to said second control device.

6. In digital control apparatus operative with a movable member for controlling the position of said member, said apparatus being operative with a source of voltage, the combination of a first control device having a variable inductance and being operative with said voltage source for providing a magnetic field, a second control device including a rotary shaft member and a control member made of magnetic material and including at least a first control portion and a second control portion operative to vary the inductance of said first control device, with said rotary shaft member being operatively connected to said movable member such that said rotary shaft member is rotatable through a predetermined range of rotation for a corresponding predetermined movement of said movable member, with said second control device being operative with said magnetic field such that said first control portion is positioned within said magnetic field corresponding to a first position of said movable member and said second control portion is positioned within said magnetic field corresponding to a second position of said movable member to thereby determine the inductance of said first control device, and a position reset control device operatively connected to one of said first and second control devices and responsive to the inductance of said first control device for controlling the position of said one control device as a predetermined function of said inductance.

7. In digital control apparatus operative with a movable member for providing a digital binary signal for controlling the position of said member, said apparatus being operative with a source of voltage, the combination of a plurality of first control devices, with each of said first control devices having a variable inductance and being operative with said voltage source for providing a magnetic field, a like plurality of second control devices, with each of said second control devices including a rotary shaft member and a control member made of magnetic material and including a first control portion and a second control portion, with each of said rotary shaft members being operatively connected to said movable member such that each rotary shaft member is rotatable through a predetermined range of rotation for a corresponding predetermined movement of said movable member, with each of said second control devices having a different number of said first and second control portions and being operative with respectively one of said magnetic fields such that a predetermined one of said first control portion and said second control portion is positioned within said magnetic field corresponding to a first position of said movable member and the other of said first control portion and said second control portion is positioned within said magnetic field corresponding to a second position of said movable member, and thereby each of said first control devices provides one digit of said binary signal.

References Cited in the file of this patent

UNITED STATES PATENTS

| | | |
|---|---|---|
| 2,478,203 | McCoy | Aug. 9, 1949 |
| 2,537,427 | Seid et al. | Jan. 9, 1951 |
| 2,575,342 | Gridley | Nov. 20, 1951 |
| 2,643,741 | Esselman | June 30, 1953 |